3,092,203
SOUND ABSORBING FIBROUS BOARD WITH PLASTIC FILM COVERING
Games Slayter and Willis M. Rees, Newark, and Jack T. Feid, Granville, Ohio, assignors to Owens-Corning Fiberglas Corporation, a corporation of Delaware
Filed June 30, 1960, Ser. No. 39,924
6 Claims. (Cl. 181—33)

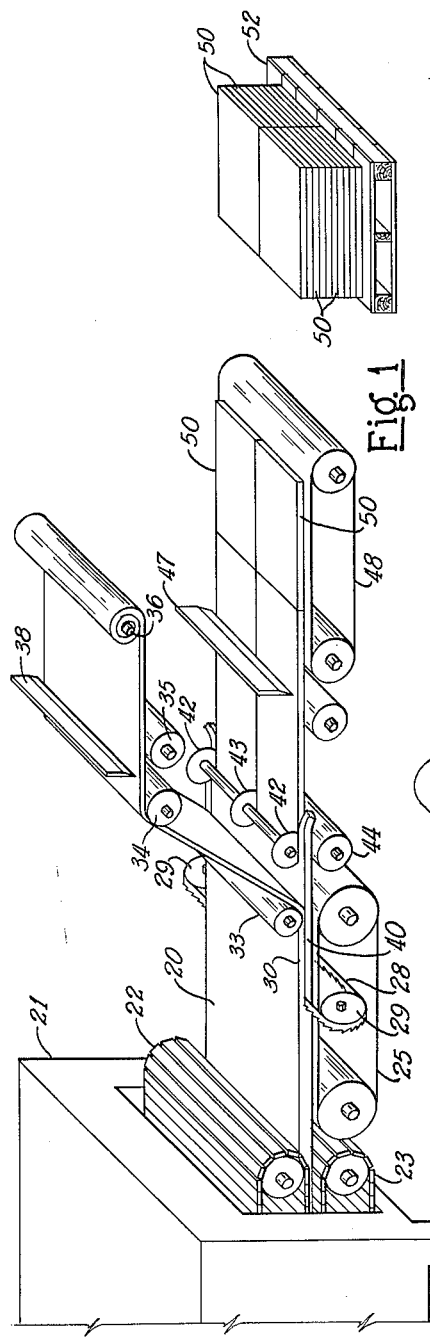
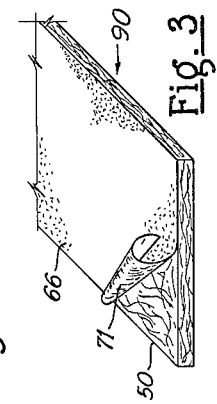
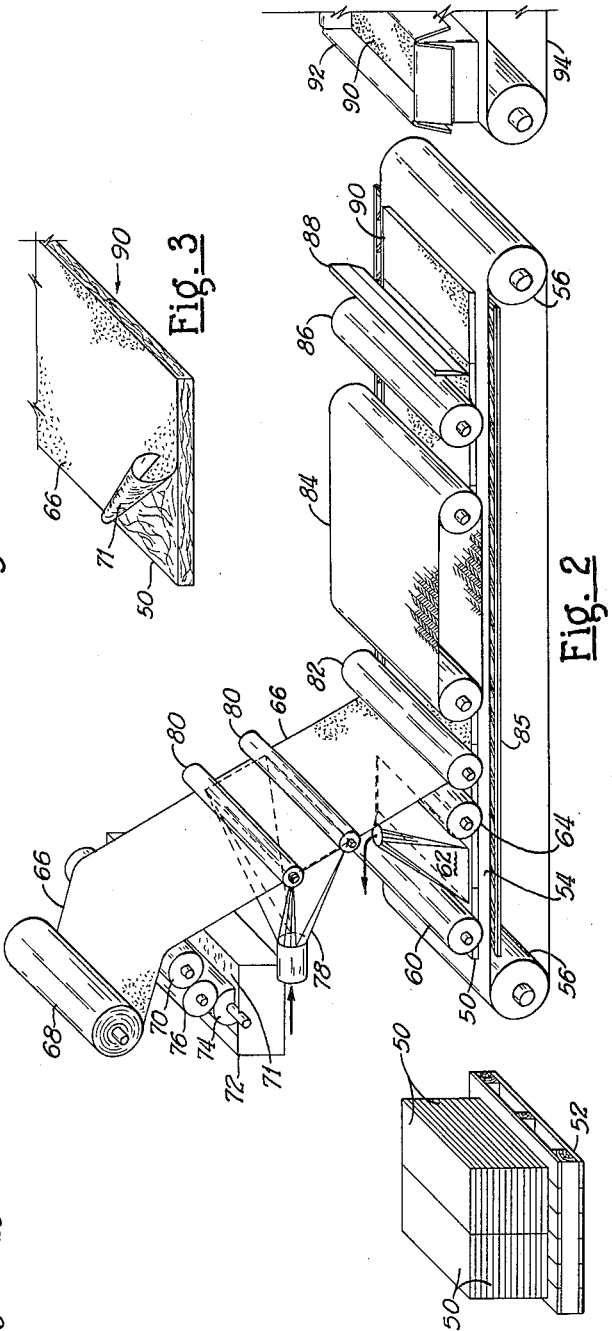
INVENTORS
GAMES SLAYTER,
WILLIS M. REES,
& JACK T. FEID
BY
ATTORNEYS June 4, 1963  G. SLAYTER ET AL  3,092,203
SOUND ABSORBING FIBROUS BOARD WITH PLASTIC FILM COVERING
Filed June 30, 1960  2 Sheets-Sheet 2
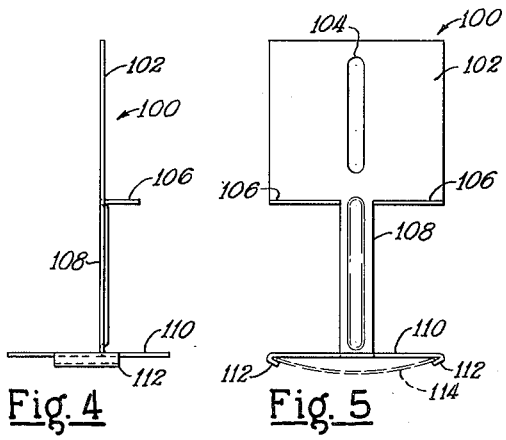
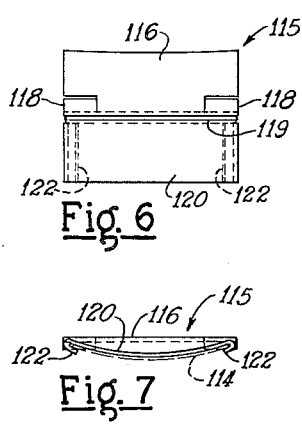
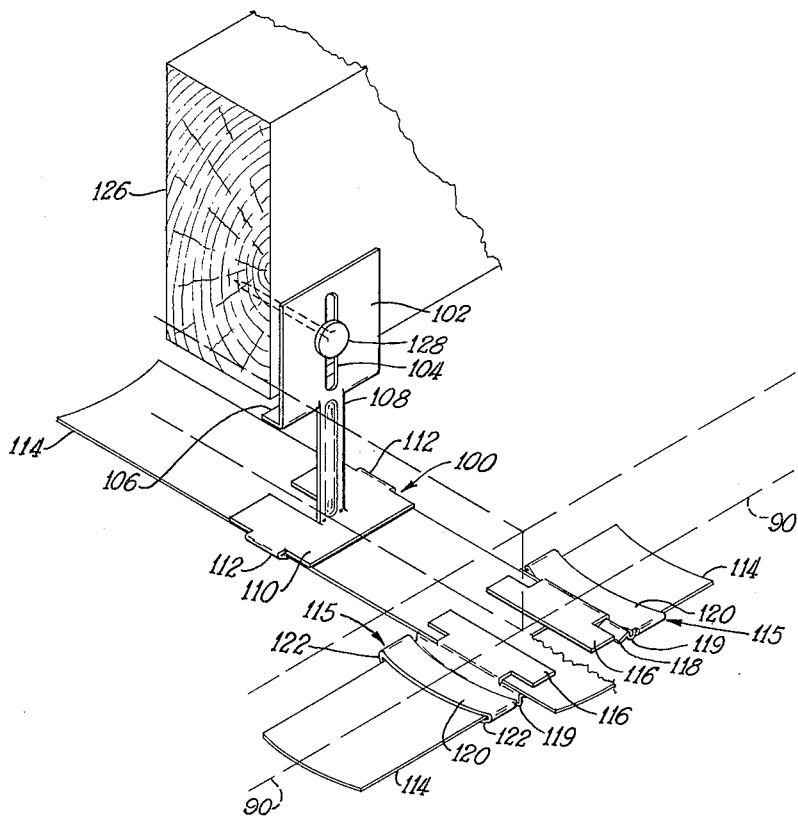
INVENTORS
GAMES SLAYTER,
WILLIS M. REES
& JACK T. FEID
BY
Staelin & Overman
ATTORNEYS

This invention relates to boards of mineral fibers for use primarily as ceiling structure, but which are also adaptable for wall coverings or partitions.

More particularly, this invention pertains to acoustical boards, preferably of fibrous glass, which have a decorative surface composed of a plastic film.

The superior qualifications of fibrous glass bodies as sound insulating media are well known. They are also highly resistant to heat transfer. In addition, the fibers are chemically inert which enables them to withstand exposure to the corrosive or destructive action of moisture, mildew, insects and air pollution.

One type of acoustical board which has enjoyed considerable commercial success is enclosed in an impervious plastic envelope, the surface of which may be decorated in different colors and patterns. In order for this covering to be capable of transmitting sound waves into the main body of the board, which in this product usually has a density of ten to twelve pounds per cubic foot, it must be unattached and free to vibrate as a diaphragm.

Other acoustical boards composed of bonded fibers carry coatings of paint over various surface configurations such as striations, pebbling, and fissures. It has been somewhat difficult to apply paint to such surfaces because of their uneven nature and also there is the danger that the deposit of paint will be too heavy and will lower the acoustical property of the boards. Such painted faces are easily marred, are hard to clean and their appearance deteriorates when washed. Another disadvantage in connection with such boards is the time and equipment involved in their manufacture in which paint spray booths and solvent drying ovens are required.

Considerable effort has been expended to produce acoustical tiles and wall boards of fibrous glass which are attractive in appearance and have effective sound absorbing properties, and it is a prime purpose of this invention to contribute to the further improvement of such products.

Uncompressed packs of bonded fibrous glass are too fluffy to have any significant rigidity. They also have undulating surfaces. To produce a pack with adequate stiffness and sufficiently uniform dimensions, the pack is compressed between conveyor flights and the binder component cured to hold the pack in its compressed form. The surfaces of such compacted packs are still irregular due to markings by the conveyor and also they may have blotches of concentrated binder or spots of heavily compacted fibers. Because of this condition, conventional acoustical tiles and boards are sanded to develop a smooth surface. In order to withstand sanding, they must have substantial density and be well-bonded.

Considerably more fibers are included in these products than are necessary from an acoustical standpoint. This extra content thus adds to the cost without proportionately improving the acoustical properties of the board.

A prime object of this invention, accordingly, is to provide a smooth surfaced acoustical board of low density and with a plastic film covering.

This object is attained in part by splitting a low density, continuous pack of bonded fibers by use of a band saw. This cuts cleanly through the light body of fibers and leaves flat clean surfaces on both sides of the cut. If the pack is two inches thick, the splitting is preferably done at the center to produce two sections each approximately one inch thick.

It has been understood that for the admittance of sound waves into an acoustical board for dissipation of the sound waves in the interstices of the fibrous mass, there must be openings in any decorative covering applied to the face of the boards; or if the covering is impervious, it must be unattached and capable of functioning as a diaphragm to pass on the sound pulsations to the interior of the boards. Such a loose covering must be either an envelope completely enclosing the board or large enough to cover one face and extend down along the edges, and be adhered to the edges.

In either arrangement more of the covering material than required to conceal the face only of the board is utilized. This extra material is in effect wasted. The folding of the plastic film around the corners of the boards is troublesome, as is the application of the adhesive to the side edges of the boards.

A perforated covering not only lacks attractiveness, but is also more difficult to clean. Accidental closing of the openings therein by paint or dirt seriously impairs its acoustical functioning.

It is then a further object of the invention to provide a ceiling board with a plastic film covering limited to the face of the board, and a covering that is imperforate and therefore more decorative and of a washable nature.

This object is made attainable by the discovery that a board of extremely low density, with a suitable amount of binder, and a selected size of fibers, has a compressibility and resilience which permits a plastic film covering, with proper characteristics and which is fixed to the face of the board, to vibrate in the manner of the conventional unattached covering and to thus allow the entry of the sound waves to the interior of the board.

A more general object of the invention is to provide an attractive, low cost board of fibrous glass.

An additional broad object of the invention is to provide an extremely light weight board of fibrous glass which has good sound absorbing properties.

These objects as well as other objects and advantages of the invention are attained by developing a clean even surface on a light weight pack of glass fibers and adhering to the clean surface a thin impervious sheet of plastic material.

More specifically, the objects of the invention are secured through splitting a bonded pack of fibrous glass and utilizing one section of the split pack for the basic stock of the boards and employing the fresh surface, resulting from the splitting operation, as the main exterior face of the boards to be produced.

More specific features of the invention include the use of a bonded pack of fibrous glass of a density between one and four pounds per cubic foot and with a binder content between ten and sixteen percent by weight.

Another feature contributing to the success of the invention constitutes the use of a facing film in a thickness between one and six mils and one which is flexible but has little elasticity or stretch in comparison with most plastic films.

Another factor helpful in the execution of the invention is the employment of an elastic adhesive in a minimum quantity to adhere the plastic film to the face of the boards.

The discovery is most surprising that a bonded board of fibrous glass of low density may be produced having sufficient resilience to compress and expand in following accord with the acoustical vibrations of a thin impervious film of plastic adhered to the face of the board, and thus to cooperate with the film in the admission of sound waves. The discovery is more impressive in view of the previously accepted belief that if an impervious film is adheringly attached to the face of a fibrous board, sound waves are prevented from entering and thus will not be subjected to the sound attenuating action of the fibrous structure.

From the standpoint of lightness and acoustical effectiveness of the board, glass fibers of a diameter in the range between twenty-two and twenty-nine hundred-thousandths of an inch and preferably twenty-seven hundred-thousandths serve most satisfactorily. Fibers of still smaller diameters would enhance some properties of the products, while fibers of somewhat larger diameters might give fairly adequate results.

The size of the fibers is determined by the type and control of the forming equipment utilized. Such apparatus ordinarily employs air, steam, or combustion gases for attenuating molten threads of glass issuing from small orifices. The fibers are collected at the forming station in pack form with an uncured binder component dispersed therethrough.

A binder composed of a combination of melamine and phenol formaldehyde resins in a proportion of roughly one to two, has acceptable strength and fire resistant characteristics. Various other fibrous glass bonding agents are well known and would be quite equally effective. These include epoxy, urea, and polyester resins. The amount of binder may run between nine and sixteen percent by weight of the board, depending upon the balance desired between sturdiness and fire protection. Twelve percent is considered generally a most satisfactory proportion.

The pack of fibers with the uncured binder dispersed therethrough is conventionally passed through an oven, while under compression between parallel flights of a pair of apron conveyors. The heat applied within the oven sets the binder, and the pack is thus permanently established in its compressed state.

A plastic film covering, especially adapted to this invention, has an unplasticized polyvinyl chloride composition and is two mils in thickness. It possesses flexibility with a minimum of stretch, and contracts to a limited degree when heated. In addition, it is extremely tough, noncombustible, and chemically resistant.

Apparatus for producing fibrous boards according to this invention is shown in the accompanying drawings in which:

FIGURE 1 is an isometric, diagrammatic view of a section of a production line adapted to produce fibrous boards of this invention;

FIGURE 2 is a like view of a section of the production line following that shown in FIGURE 1;

FIGURE 3 is a broken, perspective view of a board embodying one form of this invention;

FIGURE 4 is a side elevation of a hanger clip adapted for use in supporting a suspended ceiling of the boards of this invention;

FIGURE 5 is an end elevation of the hanger clip of FIGURE 4;

FIGURE 6 is a plan view of a supplemental clip designed for use with the main clip of FIGURES 4 and 5;

FIGURE 7 is an end elevation of the supplemental clip of FIGURE 6; and

FIGURE 8 is a perspective view of boards constructed according to this invention installed as a sub-ceiling utilizing the clips illustrated in FIGURES 4–7.

Referring to the drawings in more detail, in FIGURE 1 is shown a continuous pack 20 of bonded fibrous glass which has been compressed between conveyor flights 22 and 23 and dimensionally stabilized by the curing of the binder component in the oven 21.

With the fibers of the preferred size, it is recommended that the density of the pack be set between one and one-quarter, and two and one-quarter pounds per cubic foot, and the binder component be present in a proportion of twelve percent by weight. These specifications apply to the preferred form of comparatively thin products intended primarily for acoustical use.

When the boards are thicker and have greater planar dimensions to provide thermal as well as acoustical insulation, the boards may need the extra strengthening provided by increasing the density to as much as four pounds and the binder content as high as sixteen percent.

As the pack travels over conveyor 25, it is horizontally split in half by the band saw 28 turning on a pair of drums 29. The compressed pack delivered from the oven 21 will be considered as having a thickness of two inches and as being split by the band saw into two equal sections nominally one inch in thickness. A pack three inches thick may be split into two or three pieces depending upon the thickness desired in the final board. On the same basis, a four inch pack may be split into two to four parts.

However, it is considered desirable for each board to retain one side or face of the pack. The strengthening properties of an original side of the pack, due to the extra binder therein and the ironing effect of the compression under heat, contributes importantly to maintaining the board against sagging when it is suspended in a ceiling installation. For this reason, whatever the thickness of the pack, it is advisable that it be split just once for producing two boards only.

The upper split portion 30 of the pack turns upwardly under guide roller 33 and then across guide rollers 34 and 35 to be wound on the mandrel 36. A knife 38 cuts this upper section of the pack into lengths suitable for successive loading on a series of mandrels 36. The stock thus rolled may be subsequently processed in the same manner as the lower half 40 of the pack in the equipment shown herein, or may be otherwise utilized.

As illustrated, the lower half 40 of the horizontally split pack moves past the edge trimming discs 42 and the longitudinal slitting disc 43. A support roller 44 is positioned beneath these discs.

A knife or chopper 47 then cuts the two divided strips of the pack crosswise into individual boards 50 which may be forty-eight inches in length longitudinally of their travel and twenty-four inches wide. Another size for which there is a substantial demand is forty-eight inches square. Actually, the dimensions may be varied considerably, particularly that of length, as it is quite feasible to produce boards twenty feet long.

The boards are collected from the conveyor 48 and laid for transportation on a series of pallets 52. In the particular arrangement disclosed, the boards are brought by the pallets 52 to the following section of the production line shown in FIGURE 2. Here the boards 50 are laid crosswise of the conveyor 54, which runs between the end drums 56 and has its upper course supported by a steel herringbone assembly 85.

To remove loose fibers resulting from the band saw splitting of the pack, the boards are passed beneath a vacuum hood 62 between rolls 60 and 64.

A plastic film 66 is next placed on the upper face of the closely arrayed boards 50. This is preferably an embossed, creped or imprinted, unplasticized polyvinyl chloride film in a thickness no greater than two mils and may incorporate an opaque, white pigment. The film 66 is delivered in a continuous sheet from a supply roll 68. As the sheet moves downwardly, a coating roller 70 applies adhesive 71 to the under surface of the sheet. The adhesive is held in a tank 72 and carried therefrom to the coating roller 70 by transfer rollers 74 and 76.

The adhesive is most desirably, if not necessarily, rather elastic in nature to allow the plastic film to vibrate easily. Those of an elastomeric composition such as solutions, dispersions, or emulsions of butadiene-styrenes, nitriles or neoprenes with a fire resisting component are considered most suitable. For greater strength synthetic resin modifiers may be included in these materials.

An adhesive with a butadiene-styrene base and a petroleum vehicle, in which the solid content is about twenty-nine percent, serves very satisfactorily. This is applied at a recommended rate of three or four grams, wet weight, per square foot.

Heated air discharged from the manifold 78 volatilizes a major portion of the solvent of the adhesive composition. Retainer rolls 80 support the plastic sheet from the opposite side against the force of the heated air movement. A guide roller 82 then positions the coated sheet upon the series of boards 50.

The plastic sheet with its adhesive coating in a tacky condition is held gently against the face of the traveling boards by the weight of the woven-wire conveyor 84. To prevent sagging of the conveyor 54, its upper course is supported by a steel herringbone assembly 85. A pressure idler roller 86 then positively forces the sheet against the faces of the boards to assure a final cohesion of the sheet with the boards. The chopper 88 is actuated to cut the film along the crosswise edges of the adjoining boards. The thus finished boards 90 may then be placed in cartons 92 on the following packaging conveyor 94.

The finished boards 90 are extremely light weight when compared to conventional boards, but still are of a self-sustaining and dimensionally stabilized character. Because of their lightness, they may be supported by simple hangers or other mounting means of not great sturdiness.

In FIGURES 4 through 8 is illustrated an arrangement for suspending these boards with light gauge clips and metal slats, the latter being arcuate in cross section for added strength.

The main hanger clip 100 is shown separately in FIGURES 4 and 5. It has an upper plate portion 102 adapted to be placed against the side of a wooden joist to which it is held by a nail or screw driven into the joist through the slot 104. This slot is elongated to allow vertical adjustment of the clip 100 in leveling the suspended ceiling of boards.

The horizontal flanges 106 on the lower edge of the plate 102 limit the permissible upward movement of the plate by abutting the bottom of the joist. This assures enough room beneath the joist for the boards supported by the hanger clips 100.

Suspended from the plate 102 by a leg 108 is a horizontally disposed lower plate 110. This has a pair of opposed flanges 112 for gripping the edges of a laterally bowed slat 114. The slat is utilized to not only carry the ceiling boards, but also to conceal the cracks between boards running in line therewith.

Similar slats are positioned at right angles to the slats held by the clips 100. These supplemental slats cover the joints between the boards parallel thereto. For supporting these secondary slats, the auxiliary clips 115 of FIGURES 6 and 7 are designed to engage the main slats with the flat side 116 of each clip overlying a slat and the prongs 118 grasping the edges of the slat as may be seen in FIGURE 8.

The opposite end 120 of each clip 115 beyond the rib 119 is curved in section to fit over a secondary slat and has gripper flanges 122 to engage the edges of the slat. The rib 119 running crosswise of the clip acts as a stop to limit the inward extension of a slat by abutting the end thereof. A portion of an installation of boards 90 hung on clips 100 and 115 is shown in FIGURE 8. One of the clips 100 is shown secured to the joist 126 by a nail 128.

Such a sub-ceiling of boards of this invention is thus not only easy to install, but presents an attractive appearance and has a very satisfactory noise reduction coefficient between .75 and .80.

The resilient strength of the base pack of bonded fibers acts to maintain the finished board in position and dimensionally stabilized. However, the plastic film which is tautly adhered to the face of the board has considerable tensile strength and cooperates in keeping the board from bowing downwardly between supports of a suspension system.

At the same time, the compressibility of the base pack permits the board to be temporarily bent to be passed up between rigid supporting elements, and the high resilience of the stock snaps the board back to its normal planar state when the board is released from its manually bent form. When the board is so bent, the plastic film stretches at the most to only a slight degree while the pack is sharply compressed along the line of flexure. Other acoustical boards, which are structurally self-supporting, are too rigid for such bending.

The film is flexible but has comparatively little elastic stretch with an elongation below the elongation range of most plastic films. The lively springiness of the base pack is of ascending force under compression, but is initially of such a light sensitivity that it acts with the facing plastic film to permit and to contribute to the full diaphragmatic vibratory response of the plastic film to the impingement of sound waves. The sound energy is thus transmitted through the film for absorption by the underlying fibrous pack.

Another attribute of the board of this invention is its translucent property arising from its low density. Should it be desired to utilize this quality for diffusing or spreading light, the pigmentation of the facing film is preferably reduced.

In summary, the meritorious accomplishments of this invention are founded on a combination of novel conceptions and discoveries including the springy, resonating action of an easily compressible, highly resilient, low density pack of bonded fibers; a smooth, clean surface suitable for the facing of an acoustical board secured from such a low density pack by horizontally splitting of the pack; and the action of a vibratile plastic film in very effectively transmitting sound waves when it is adhesively applied to such a smooth facing of a board composed of such resilient, resonating stock.

The smooth, clean surface secured by splitting a pack of fibers receives neatly the plastic covering sheet, and the softer, more uniform character of the interior of the original pack which forms this surface improves the performance of the boards acoustically. The boards require a very economical amount of fibrous stock and, as demonstrated herein, may be produced easily and at low cost.

The low density of the base pack is considered most desirable for sound attenuating purposes and the consequent light weight is a decided advantage in shipping, handling and installation. The board has sufficient rigidity to maintain itself in position and to retain its shape, while being durable, and fire and moisture resistant. Accordingly, it possesses a unique set of properties few of which are found together in other fibrous boards.

Where decorative effect is the major consideration, the boards need be only one-half inch thick. On the other hand, should greater thermal insulation be desired in addition to sound dampening, the boards may be supplied in thicknesses upwardly of one and one-half inches, with six inches being a likely upper limit. The increased strength of the thicker boards permits them to be made in larger sizes. For instance, a board three inches thick could be four feet wide and twelve feet long. Its light weight and large area would facilitate installation, while decorative effect, sound absorption and thermal insulation would all be provided by the single, low cost product.

Within the precincts of the invention, various substitutions and modifications may be made in respect to the materials and processing steps herein disclosed. Other plastic films such as polyethylene, plasticized polyvinyl chloride, polyvinylidine chloride, nylon, polycarbonate and polyvinyl fluoride may be utilized quite satisfactorily. However, with such alternate materials some sacrifices of sound transmission qualities could arise from increased thicknesses, and from greater elasticity or stretch.

Likewise, various thermoplastic, thermosetting and other elastomer adhesives may give good service for joining the plastic film to the boards. Many of these are available in liquid form and in formulations to adhere rapidly with little or no heat.

Other modifications and substitutions, within the spirit of the invention and the scope of the accompanying claims, will occur to those skilled in the arts involved.

We claim:

1. An acoustical panel unit comprising a resilient, bonded body of mineral fibers having a density of one to four pounds per cubic foot and having one face of uni-planar configuration, a flexible plastic film of one to six mils in thickness continuously adhered to said uni-planar face, said film being vibrationally responsive to sound energy impinged thereagainst to transmit such sound energy into the resilient body for attenuation.

2. An acoustical panel unit according to claim 1 in which the plastic film is adhered by an elastomeric adhesive.

3. An acoustical panel unit according to claim 1 in which the plastic film is composed of a substantially unplasticized polyvinyl chloride.

4. An acoustical panel unit according to claim 1 in which the fibers are of glass composition and are between twenty-two and twenty-nine hundred-thousandths of an inch in diameter.

5. An acoustical panel unit according to claim 1 in which there is a binder component in the body of mineral fibers constituting between nine and sixteen percent by weight thereof.

6. An acoustical panel unit according to claim 1 in which the portion of the body of mineral fibers in the region adjacent the face opposite to the uni-planar face is less resilient than the remainder of the body.

References Cited in the file of this patent

UNITED STATES PATENTS

| | | |
|---|---|---|
| 2,031,900 | Miller | Feb. 25, 1936 |
| 2,045,311 | Roos et al. | June 23, 1936 |
| 2,081,952 | Parkinson | June 1, 1937 |
| 2,237,032 | Haux | Apr. 1, 1941 |
| 2,338,813 | Hueter | Jan. 11, 1944 |
| 2,497,912 | Rees | Feb. 21, 1950 |
| 2,694,233 | Page | Nov. 16, 1954 |
| 2,744,044 | Toulmin | May 1, 1956 |
| 2,809,145 | McDermott | Oct. 8, 1957 |
| 2,850,109 | Benjamin | Sept. 2, 1958 |
| 2,868,684 | Labino | Jan. 13, 1959 |
| 2,920,357 | Ericson | Jan. 12, 1960 |
| 2,959,242 | Muller et al. | Nov. 8, 1960 |

FOREIGN PATENTS

| | | |
|---|---|---|
| 162,280 | Australia | Mar. 30, 1955 |
| 768,826 | Great Britain | Feb. 20, 1957 |

OTHER REFERENCES

Structural Engineers' Handbook, by Milo Ketchum, McGraw-Hill Book Co., Inc. (1924), 2nd edition, page 261.